US012688006B2

(12) United States Patent
Winton et al.

(10) Patent No.: US 12,688,006 B2
(45) Date of Patent: Jul. 21, 2026

(54) HIERARCHICAL PRIORITY ALERT DUCKER MATRIX

(71) Applicant: Harman International Industries, Incorporated, Stamford, CT (US)

(72) Inventors: Riley Winton, Opelika, AL (US); Maxwell B Willis, Detroit, MI (US); Skyler L Schmidt, Detroit, MI (US); Antonio Gomez, Hazel Park, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 215 days.

(21) Appl. No.: 18/434,645

(22) Filed: Feb. 6, 2024

(65) Prior Publication Data

US 2025/0251901 A1      Aug. 7, 2025

(51) Int. Cl.
*G06F 3/16* (2006.01)
*H04R 5/04* (2006.01)

(52) U.S. Cl.
CPC ............... *G06F 3/165* (2013.01); *H04R 5/04* (2013.01)

(58) Field of Classification Search
CPC . G06F 16/632; G10L 15/22; G10L 2015/223;

G10L 15/00; G10L 2015/225; G11B 31/003; H04M 1/724098; H04M 1/72442; H04W 4/40; H04R 2499/13
See application file for complete search history.

(56) References Cited

U.S. PATENT DOCUMENTS

| | | | | |
|---|---|---|---|---|
| 2007/0127734 A1* | 6/2007 | Brulle-Drews | .......... | H04R 5/04 |
| | | | | 381/86 |
| 2015/0358730 A1* | 12/2015 | Kirsch | .................. | H04R 3/002 |
| | | | | 381/71.1 |
| 2022/0095046 A1* | 3/2022 | Winton | .................... | H04R 5/04 |
| 2022/0210584 A1 | 6/2022 | Freund et al. | | |
| 2022/0413793 A1 | 12/2022 | Fry | | |

FOREIGN PATENT DOCUMENTS

WO      2023/077067 A1      5/2023

* cited by examiner

*Primary Examiner* — Phung-Hoang J Nguyen
(74) *Attorney, Agent, or Firm* — Angela M. Brunetti

(57) ABSTRACT

A system and method for organizing incoming data from audio sources and vehicle system inputs into one or more matrices to hierarchically prioritize the incoming data into one or more of a low priority mixer, a medium priority mixer and a high priority mixer. The hierarchically organized incoming data is prioritized and assigned as an input or a trigger to one or more duckers to generate a mixed audio signal that combines attenuated and ducked incoming data. A mixed audio signal is transmitted over a communication link for playback by a personal audio device.

13 Claims, 8 Drawing Sheets

HIERARCHICAL PRIORITY ALERT DUCKER MATRIX

BACKGROUND OF THE INVENTION

The invention is directed to an integrated in-vehicle personal audio system and, more particularly, to a ducker for alerts in an in-vehicle personal audio system.

Vehicles typically include vehicle entertainment systems, such as in-car entertainment (ICE) or in-vehicle infotainment (IVI) systems, which include various hardware and software components that enhance the driver and passenger experience by providing audio or video entertainment, video gaming capability, Internet connectivity, and associated features to passengers and drivers. A given vehicle can include multiple devices, such as mounted units, rear-seat entertainment (RSE) units mounted on a vehicle seat, and/or portable devices that connect (wirelessly or otherwise) to the vehicle. Typically, each device is connected to a central hub, such as a head unit mounted near the driver seat, typically within the dashboard of the vehicle.

This creates a personalized zone that connects each of the vehicle occupants to the vehicle. Indicators may include, but are not limited to, emergency vehicle alerts, navigation prompts, chimes indicating a door is ajar or a trunk is open, etc. In a personalized zone the indicators that are typically received visually are also being audibly presented to each occupant in their personalized zone. The indicators may be external and internal to the vehicle cabin. Furthermore, indicators and signals are mixed and presented to each occupant depending on their level of engagement with the vehicle. For example, the driver is in a personalized zone that requires signals and alerts with high priority for being presented to the driver. Alternatively, a passenger in the rear seat does not necessarily need to be exposed to navigation prompts and/or safety alerts.

One drawback is that occupants are being presented with multiple types of inputs, alerts, and communication signals yet some signals are more critical for an occupant than others and presenting them all simultaneously may be counterproductive to the purpose of the alert. There is a need to allow critical safety alerts to be presented in parallel with less critical alerts and indicators in a manner that properly ducks, or attenuates, the less critical alerts to the alerts that are considered to be more critical.

SUMMARY OF THE INVENTION

One or more embodiments of the inventive subject matter is a system and method for organizing incoming data from audio sources and vehicle system inputs into one or more matrices to hierarchically prioritize the incoming data into one or more of a low priority mixer, a medium priority mixer and a high priority mixer. The hierarchically organized incoming data is prioritized and assigned as an input or a trigger to one or more duckers to generate a mixed audio signal that combines attenuated and ducked incoming data. A mixed audio signal is transmitted over a communication link for playback by a personal audio device.

One or more embodiments organize incoming data from audio sources and vehicle systems into one or more matrices to organize incoming data from sources inside the vehicle into a seat media matrix, a communications zone matrix, and a voice sense matrix.

One or more embodiments assign the incoming data as an input or a trigger to one or more of a media ducker, a communications ducker, a low priority ducker, and a medium priority ducker. generating a mixed audio signal further comprises a media mixer to mix signals from sources inside the vehicle and an ambience mixer to mix signals from sources outside the vehicle.

One or more embodiments generate a mixed audio signal by attenuating and ducking incoming data having a lower priority in response to a trigger having a higher priority.

One or more embodiments generate the mixed audio signal using a seat mixer to mix signals from the media mixer and the ambience mixer based on a priority assigned to an input to the one or more duckers and a presence of a trigger to the one or more duckers.

One or more embodiments transmit the mixed audio signal to stimulate an audio playback device or a tactile actuator.

BRIEF DESCRIPTION OF DRAWINGS

The embodiments of the present disclosure are pointed out with particularity in the appended claims. However, other features of the one or more embodiments will become more apparent and will be best understood by referring to the following detailed description in conjunction with the accompany drawings in which:

DETAILED DESCRIPTION OF THE INVENTION

Detailed embodiments of the present invention are described herein. However, it is understood that the disclosed embodiments are merely exemplary, and the invention may be embodied in various alternative forms. The figures are not necessarily drawn to scale. Some features may be exaggerated or minimized to show details of particular components. Therefore, specific structural and functional details disclosed herein are not to be interpreted as limiting, but merely as a representative basis for teaching one skilled in the art to employ the present invention.

In the following description, multiple instances of like objects are described with reference numbers identifying the object and additional numbers identifying the instance where needed (e.g., 110(1), 402(1)).

Figure 1:
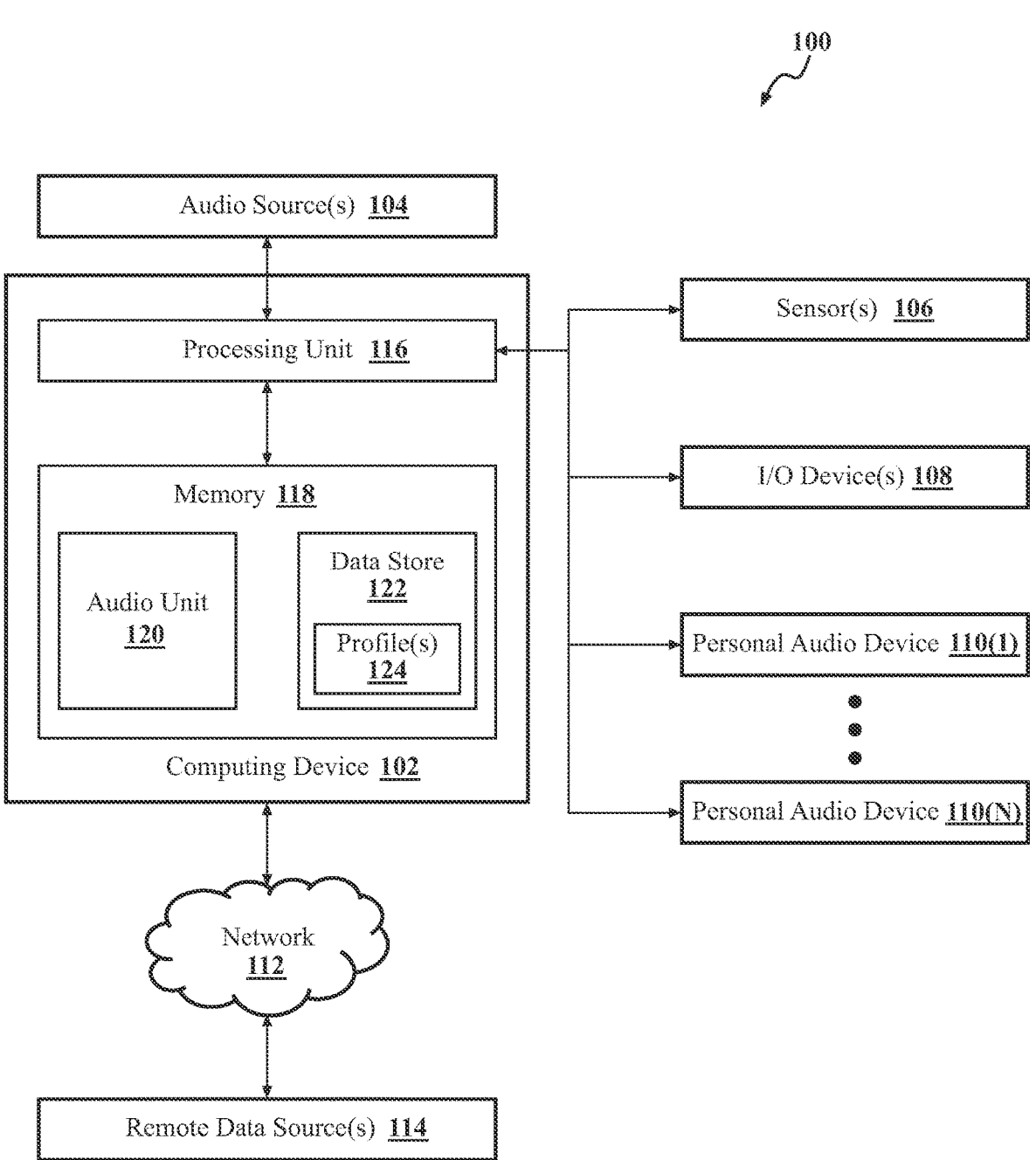
FIG. 1 is a block diagram of an audio system.

FIG. 1 is a block diagram of an audio system 100, in a vehicle for example, that is configured to implement one or more elements of the inventive subject matter. The audio system 100 has a computing device 102, audio sources 104, sensors 106, input/output (I/O) devices 108, personal audio devices 110(1) to 110(n), a network 112, and remote data sources 114. The computing device 102 has a processing unit 116 and memory 118. The memory 118 has an audio unit 120 and a data store 122. The data store 122 has a plurality of profiles 124.

The computing device 102 includes the processing unit 116 and the memory 118. In one or more embodiments, the computing device 102 is a device that includes one or more processing units 116, such as a system-on-a-chip (SoC). In one or more embodiments, the computing device 102 is a mobile computing device, such as a tablet computer, mobile phone, media player, and so forth that connects (wired and/or wirelessly) to other devices in the vehicle. In some embodiments, the computing device 102 is a head unit included in a vehicle system. Additionally, or alternatively, the computing device 102 may be a detachable device that is mounted in a portion of a vehicle as part of an individual console. Generally, the computing device 102 is configured to coordinate the overall operation of the audio system 100. The embodiments disclosed herein contemplate any technically feasible system configured to implement the functionality of the audio system 100 via the computing device 102. The functionality and techniques of the audio system 100 are also applicable to other types of vehicles, including consumer vehicles, commercial trucks, airplanes, helicopters, etc.

The processing unit 116 can include one or more central processing units (CPUs), digital signal processing units (DSPs), microprocessors, application-specific integrated circuits (ASICs), neural processing units (NPUs), graphics processing units (GPUs), field-programmable gate arrays (FPGAs), and so forth. The processing unit 116 generally includes a programmable processor that executes program instructions to manipulate input data and generate outputs. In some embodiments, the processing unit 116 can include any number of processing cores, memories, and other modules for facilitating program execution. For example, the processing unit 116 could receive input from a user via the I/O devices 108 and generate pixels for display on an I/O device 108 (e.g., a display device). In some embodiments, the processing unit 116 is configured to execute the audio unit 120 to control audio playback on one or more devices, including one or more personal audio devices 110. In such instances, the audio unit 120 organizes, prioritizes, and mixes additional audio components based on data from multiple devices to provide a mixed audio signal that incorporates information from the vehicle environment both inside and outside the vehicle.

The memory 118 can include a memory module or collection of memory modules. The memory 118 generally comprises storage chips such as random-access memory (RAM) chips that store application programs and data for processing by the processing unit 116. In one or more embodiments, the memory 118 includes non-volatile memory, such as optical drives, magnetic drives, flash drives, or other storage. In some embodiments, separate data stores, such as the remote data sources 114 connected to the network 112 (e.g., "cloud storage") are connected to the audio unit 120. The audio unit 120 within the memory 118 is executed by the processing unit 116 to implement the overall functionality of the computing device 102 and, thus, coordinate the operation of the audio system 100 as a whole.

The audio unit 120 processes incoming data from one or more devices and controls the personal audio devices 110 and/or other vehicle speakers to reproduce audio signals. In one or more embodiments, the audio unit 120 establishes communications channels in configurations to provide high fidelity audio content in the audio signal that the personal audio device 110 reproduces. In one or more embodiments, the audio unit 120 scales connections to the personal audio devices 110(1)-110(n). For example, the audio unit 120 can connect to six separate personal audio devices simultaneously inside a vehicle. In some embodiments, the audio unit 120 detects the personal audio device 110 as the device enters or gets close to the vehicle. For example, the audio unit 120 can use ultrawideband (UWB) communications and/or near-field communications (NFC) to detect that the personal audio device 110 is proximate to, or within, the vehicle. In one or more embodiments, the audio unit 120 gathers various types of data and provides notifications about the data to the user. For example, the audio unit 120 can provide super hearing functionality to a given personal audio device 110 by acquiring sounds (e.g., emergency vehicles, pedestrians, cyclists outside of the vehicle, ambient sounds, voices of other occupants, etc.) from external and/or internal microphones and mixing the acquired sounds with the audio signal such that the user hears the acquired sounds while using the personal audio device 110.

The data store 122 is a portion of the memory 118 that stores various data locally, including profiles 124 (e.g., user profiles, device profiles, etc.) and other data (not shown), such as content items, data tables (e.g., a table mapping audio tones to events) and/or application data (e.g., secure application data, metadata, etc.) associated with the audio unit 120. In one or more embodiments, the data store 122 can be included in volatile memory and can correspond to a section of nonvolatile memory. In some embodiments, the computing device 110 can sync data between the volatile memory and the nonvolatile memory so that copies of data are stored in both the volatile and nonvolatile memory. In some embodiments, the data store 122 store downloaded content items received via network 112 in order to enable playback when access to the network 112 is unavailable or when the network resources of the vehicle are limited.

The profile(s) 124 include device profiles associated with specific personal audio devices 110 and/or user profiles associated with specific users. In some embodiments, the user profile is linked to one or more device profiles and vice versa. In such instances, the audio unit 120 prompts the user to select which personal audio device 110 is in use. In one or more embodiments, the profile 124 includes configuration information associated with audio reproduction of an audio signal using the personal audio device 110 and/or vehicle speakers. Such configuration can include, for example, specific equalizer settings, selected speaker preferences, auditory augmented reality (AR) preferences, and so forth. The audio unit 120 uses the profile to determine which audio output devices (e.g., the personal audio device 110(1), one or more vehicle speakers, etc.) to use to reproduce audio signals and how to modify an incoming audio signal.

The audio source(s) 104 include one or more data sources that provide the audio signal for reproduction. In one or more embodiments, the audio source 104 is included in a device within the vehicle, such as an entertainment subsystem included in the head unit of the vehicle, a rear-seat entertainment console, a device mounted in the vehicle, and so forth. In some embodiments, the audio source 104 is included in a mobile device, wearable device, and/or other portable device that connects to the audio unit 120. Additionally, or alternatively, the audio source 104 can be remote to the vehicle. For example, the audio source 104 can be included in the remote data source 114. In such instances, the remote data source 114 streams the audio signal to the computing device 110, whereupon the audio unit 120 transmits the audio signal to the personal audio device 110 for reproduction.

The sensor(s) 106 include one or more devices that perform measurements and/or acquire data related to certain subjects in an environment. In one or more embodiments, the sensors 106 generates sensor data that is related to the user and/or objects in the environment that are not the user. In some embodiments, the sensors 106 are coupled to and/or included within the computing device 110 and send sensor data to the processing unit 116.

In one or more embodiments, the sensors 106 include audio sensors, such as microphones and/or a microphone array that record external sounds and/or internal microphones that record sounds within the compartment of the vehicle. In some embodiments, the sound data acquired by the microphones is processed by the audio unit 120 performing various natural language (NL) processing techniques, sentiment analysis, and/or speech analysis in order to determine the semantic meaning of the phrases spoken in the environment.

In some embodiments, the sensors 106 include optical sensors, such as RGB cameras, infrared cameras, depth cameras, and/or camera arrays, which include two or more of such cameras. Other optical sensors can include imagers and laser sensors. In some embodiments, the sensors 106 includes physical sensors, such as touch sensors, pressure sensors, position sensors (e.g., an accelerometer and/or an inertial measurement unit (IMU)), motion sensors, and so forth, that register the body position and/or movement of the user and/or the personal audio device 110. In some embodiments, the sensors 106 include physiology sensors, such as heart-rate monitors, electroencephalography (EEG) systems, radio sensors, thermal sensors, galvanic skin response sensors (e.g., sensors that measure change in electrical resistance of skin caused by emotional stress), contactless sensor systems, magnetoencephalography (MEG) systems, and so forth.

The input/output (I/O) devices 108 include devices capable of receiving input, such as a keyboard, a mouse, a touch-sensitive screen, a microphone, and other input devices for providing input data to the computing device 110. In one or more embodiments, the I/O devices 108 are associated with a specific console, such as personalized screens mounted to a portion of a seat, the personal audio device 110, personalized loudspeakers within the vehicle, console-specific input components, and so forth. Additionally, or alternatively, the I/O devices 108 include various devices capable of providing output, such as a display screen, loudspeakers, and the like. In one or more embodiments, one or more of the I/O devices 108 is incorporated in the computing device 110 or is external to the computing device 110. In some embodiments, the computing device 110 and/or the one or more I/O devices 108 can be components of an advanced driver assistance system (ADAS) or an entertainment subsystem included in the vehicle. In one or more embodiments, the audio unit 120 responds to various inputs received by the one or more I/O devices 108. For example, the vehicle could include a head unit that includes a user interface. In such instances, the audio unit 120 could respond to one or more touch inputs and/or NL voice inputs received via the head unit.

The personal audio devices 110 (e.g., 110(1) to 110(n)) include one or more headphones, earbuds, wearable devices, and/or other types of personalized audio devices that reproduce audio signals to provide audio content to an individual. In some embodiments, the personal audio device 110 provides directional sound (e.g., a collar that provides directional loudspeakers) in a manner that provides personalized audio to the listener. In some embodiments, the personal audio devices 110 are configured to provide equalization, noise cancellation, audio augmented reality, high fidelity audio, and/or other features. In some embodiments, the personal audio devices 110 uses a specialized protocol and/or are fabricated using a specialized hardware to communicate with the audio unit 120 with low latency.

The network 160 enables communications between the computing device 110 and other devices in network 160 via wired and/or wireless communications protocols, satellite networks, V2X networks, including Bluetooth, Bluetooth low energy (BLE), wireless local area network (Wi-Fi), cellular protocols, and/or near-field communications (NFC).

The remote data source(s) 114 include a computing device, such as a laptop, tablet, smart phone, cellular phone, desktop, teleconferencing system, etc., that communicates with the computing device 102. In some embodiments, the remote data source is a software service or a device that executes a media application, such as audio software, video software, audio call software, messaging software, media serving platforms, and so forth. In such instances, the remote data source 114 can use such media applications to communicate with the audio unit 120 operating within the vehicle.

The computing device 102 executes instructions to the audio unit 120 to control the playback of audio from one or more vehicle components and/or personal audio devices 110(1)-110 (n) within the vehicle. In particular, the processing unit 116 receives data from the sensors 106, the I/O devices 108, and/or the personal audio devices 110(a)-110 (n). The audio unit 120 processes the data to detect the presence of at least one personal audio device, e.g., 110(1). Upon detecting the at least one personal audio device 110(1), the audio unit 120 determines whether the personal audio device 110(1) is known and, if so, whether the personal audio device 110(1) is associated with a known user and/or user profile. When the personal audio device 110(1) is known, the audio unit 120 loads a profile 124 for the user and/or the personal audio device 110(1). The profile 124 may include configuration information associated with audio playback using the personal audio device 110(1) and/or vehicle speakers, including one or more specific equalizer settings, selected speaker preferences, auditory augmented reality (AR) preferences, etc. The audio unit 120 uses the profile 124 to determine which audio output devices (e.g., the personal audio device 110(1), one or more vehicle speakers, etc.) to use to reproduce audio signals and how to modify an incoming audio signal. The audio unit 120 establishes a communication link with the personal audio device 110(1). In one or more embodiments, the audio unit 120 determines a position of the personal audio device 110(1), determines a sound zone for the determined position and manages speakers within the sound zone. Sound zones are described in detail later herein with reference to FIG. 4. In one or more embodiments, the audio unit 120 mutes the speakers in the sound zone so that only the personal audio device 110(1) reproduces an audio signal within the sound zone. Alternatively, in one or more embodiments, the audio unit 120 controls the set of speakers in the sound zone in conjunction with the personal audio device 110(1) such that the personal audio device 110(1) and the set of speakers collectively reproduce an audio signal.

When the audio unit 120 streams an audio signal to the sound zone for reproduction, the audio unit 120 continually processes incoming data from various devices such as, but not limited to, the sensors 106, the I/O devices 10, vehicle components, remote data sources 114, etc.) to determine whether to mix additional audio components with the audio signal. The additional audio components may include an audio clip recorded by a microphone, such as sound from outside the vehicle or an utterance from another vehicle occupant. Additionally, or alternatively, the additional audio components may include an audio tone associated with an event type triggered by incoming data (e.g., an audio notification indicating a navigational tone, an alert notification based on a controller area network message, etc.). When the audio unit 120 determines to add an additional audio component, the audio unit 120 mixes the audio signal with the additional component, ducking the audio signal as needed to produce an attenuated version of the audio signal that enables the additional audio component to be heard by the user. The audio unit 120 transmits the mixed audio signal to the speakers in the sound zone for reproduction.

Figure 2:
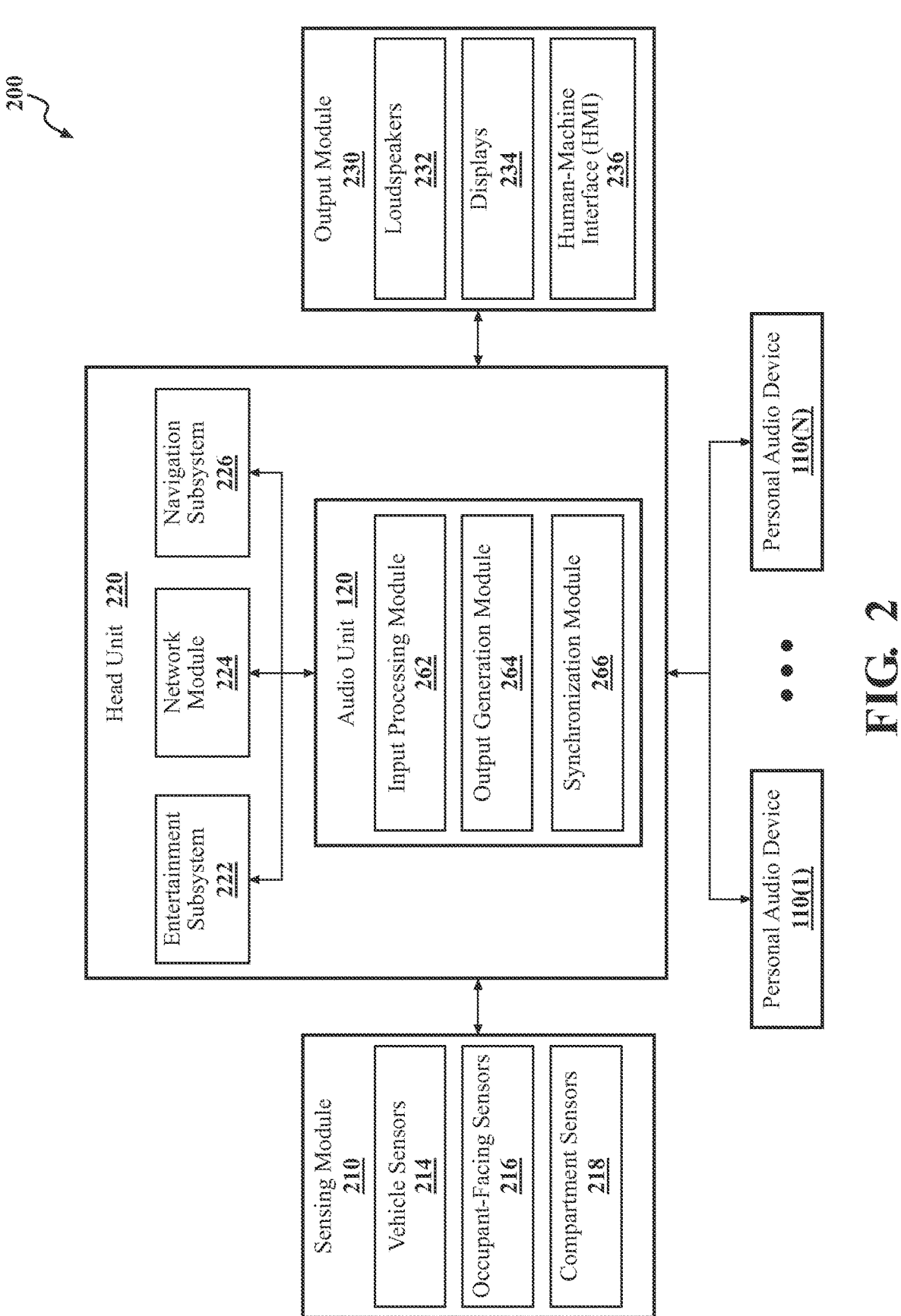
FIG. 2 is a block diagram of an example vehicle system.

FIG. 2 is a block diagram of an example vehicle system 200 that includes the audio unit 120 of FIG. 1, according to one or more embodiments. As shown, the vehicle system 200 includes, without limitation, a sensing module 210, a head unit 220, an output module 230, and a set of personal audio devices 110 (e.g., 100(1) to 110(N)). The sensing module 210 includes, without limitation, vehicle sensors 214, occupant-facing sensors 216, and compartment sensors 218. The head unit 220 includes, without limitation, the audio unit 120, an entertainment subsystem 222, a network module 224, and a navigation subsystem 226. The output module 230 includes, without limitation, loudspeakers 232, displays 234, and a human-machine interface (HMI) 236. The audio unit 120 includes, without limitation, an input processing module 262, an output generation module 264, and a synchronization module 266.

In operation, the audio unit 120 establishes connections with the set of personal audio devices 110. The audio unit 120 transmits audio signals to the personal audio devices 110 and processes incoming data from the sensing module 210 and/or components of the head unit 220 to determine whether to add additional audio components to a given audio signal. The audio unit 120 then adds audio clips and/or audio tones to the audio signal to provide the user with information about the vehicle environment.

The sensing module 210 includes multiple types of sensors, including vehicle sensors 214 (e.g., outward-facing cameras, external microphones, accelerometers, etc.), occupant-facing sensors 216 (e.g., cameras, microphones, motion sensors, etc.), and/or compartment non-occupant facing sensors 218 (e.g., pressure sensors, temperature sensors, etc.). In one or more embodiments, the sensing module 210 provides a combination of sensor data that describes the context of the vehicle and the occupants that are present within the vehicle. For example, the sensing module 210 can provide a set of values associated with the occupants (e.g., positions of occupants, positions of the personal audio devices 110, noise level, etc.). In such instances, the audio unit 120 can identify which seats within the vehicle are occupied.

In one or more embodiments, the vehicle sensors 214 further includes other external sensors. Such external sensors can include optical sensors, road vibration sensors, temperature sensors, etc. In some embodiments, the sensing module 210 and/or the network module 224 acquires other external data, such as geolocation data (e.g., GNSS systems, including a global positioning system (GPS), Glonass, Galileo, etc.), demographic data, psychographic data, and so forth. In such instances, the audio unit 120 can process the incoming data. For example, the audio unit 120 can add notification tones about points of interest to the user based on the geolocation of the vehicle. In another example, the audio unit 120 provides alerts from the driver assistance system upon detection of an alert condition and provides audio clips of ambient sounds associated with the alert condition. In some embodiments, navigation data and/or geolocation data is combined and associated with a particular media configuration. For example, upon the navigation subsystem 226 generating a route between locations the audio unit 120 provides audio tones associated with navigating the route (e.g., adding voice generated clips of the navigation instructions).

The head unit 220 is a component of the vehicle that is mounted at any location within a passenger compartment of the vehicle in any technically feasible fashion. In some embodiments, the head unit 220 includes any number and type of instrumentation and applications and provides any number of input and output mechanisms. For example, the head unit 220 enables users (e.g., the driver and/or passengers) to control the entertainment subsystem 222 and/or the navigation subsystem 226. The head unit 220 supports any number of input and output data types and formats, as known in the art. For example, the head unit 220 could include built-in Bluetooth for hands-free calling and/or audio streaming, universal serial bus (USB) connections, speech recognition, rear-view camera inputs via the sensing module 210, video outputs via the output module 230 for any number and type of displays 234, and any number of audio outputs. In general, any number of sensors (e.g., sensors 106, 214, 216, 218), displays 234, receivers, transmitters, etc., can be integrated into the head unit 220, or can be implemented externally to the head unit 220. Additionally, or alternatively, the audio unit 120 can be integrated into the head unit 220 or can be implemented externally to the head unit 220. In one or more embodiments, external devices (e.g., the personal audio devices 110) communicate with the head unit 220 in any technically feasible fashion.

The entertainment subsystem 222 provides various information to the user and/or one or more other occupants of the vehicle via the output module 230. The navigation subsystem 226 provides information about the location of the vehicle and pathfinding information to reach a route. For example, the navigation subsystem via the head unit 220 and/or the HMI 236 could provide route information associated with the vehicle. The entertainment subsystem 222 enables playback of audio and/or video content from various media sources (e.g., internal sources or external media providers via the network module 224). In one or more embodiments, the entertainment subsystem enables playback of content via the audio unit 120 and/or other output devices (e.g., the output devices 108, loudspeakers 232, displays 234, and/or HMI 236) included in the output module 230.

The output module 230 performs one or more actions in response to actions performed by the head unit 220 and/or the audio unit 120. For example, the output module 230 can generate one or more output signals in response to received media signals to drive the output of the loudspeakers 232 and/or the display 234. In another example, the output module 230 could generate one or more output signals to modify the human-machine interface (HMI) 236 to display notification messages and/or alerts. In some embodiments, the HMI 236 is a different component than the display 234, such as when the HMI 236 is included as part of the windshield. In such instances, the head unit 220 can specify whether a notification is to be displayed via the display 234 or via the HMI 236.

The audio unit 120 includes various modules to manage the processing of data and to manage the transmission of audio signals for reproduction. In one or more embodiments, the audio unit 120 implements one or more of the input processing module 262, the output generation module 264, and/or the synchronization module 266 simultaneously to establish communication links with one or more of the personal audio devices 110 and mix additional audio components into an audio signal provided by the audio source 104.

The input processing module 262 processes various types of data from one or more components and/or devices. For example, the input processing module 262 processes incoming data from one or more devices to detect that a given personal audio device 110 is at a position within the vehicle. For example, the input processing module 262 can process sensor data from the sensors 106 (e.g., compartment sensors 218) indicating the position of the personal audio device 110 within the vehicle. In some embodiments, the audio unit 120 receives messages directly from the personal audio device 110(N). Additionally, or alternatively, the input processing module 262 processes incoming data from various devices associated with the environment, such as audio data from microphones recording the exterior environment of the vehicle, utterances from other occupants of the vehicle, events associated with the operation of the entertainment subsystem 222, the network module 224, the navigation subsystem 226, and so forth.

The output generation module 264 provides the audio signal to the personal audio devices 110 and/or the loudspeakers 232 for reproduction. In one or more embodiments, the output generation module 264 responds to a determination to mix additional audio content with the audio signal by generating the additional audio content and generating a mixed audio signal that includes the audio signal provided by the audio source 104 and the additional audio content. In some embodiments, the output generation module 264 extract audio content from incoming data. For example, the output generation module 264 generates an audio clip by extracting a portion of ambient sound data from the microphones included in the vehicle sensors 214. In another example, the output generation module 264 adds a notification sound indicating a change in audio track based on a notification message generated by the entertainment subsystem 222. In one or more embodiments, the output generation module 264 applies various equalization, noise reduction, and/or other sound modification techniques based on one or more profiles 124. For example, the output generation module 264 retrieves a device profile 124 associated with the personal audio device 110 and uses the device profile as an output profile to modify the audio signal before transmitting the modified audio signal to the personal audio device 110 for reproduction.

The synchronization module 266 establishes communications with the personal audio devices 110 and performs various techniques to establish communication links to the personal audio devices 110 and reduce latency when transmitting the audio signal to the personal audio devices 110. For example, the synchronization module 266 exchanges messages with the personal audio device 110 to determine the position of the personal audio device 110 within the vehicle and exchanges a set of messages to determine the characteristics for the communication link that is to be established (e.g., negotiating a capability set for a communication link, determining whether to establish a back channel, determining content protection, payload composition, etc.). Upon determining the characteristics, the audio unit 120 establishes the communications link with the personal audio device 110. Additionally, or alternatively, the synchronization module 266 performs various techniques to reduce the latency between the audio source 104 providing the audio signal and the personal audio device 110. For example, the audio unit 120 can dedicate a larger amount of processing resources to increase the throughput over the communications links.

In one or more embodiments, the synchronization module 266 establishes communications with a given personal audio device 110 upon determining that the personal audio device 110 is a certified component that is confirmed to interoperate with the audio unit 120. In such instances, the synchronization module 266 establishes connectivity to the loudspeakers 232 in lieu of the personal audio device 110 upon determining that the personal audio device 110 is not certified to operate with the audio unit 120. Additionally, or alternatively, the synchronization module 266 establishes connectivity to the loudspeakers 232 when the personal audio device 110 is not present or is not powered.

Figure 3:
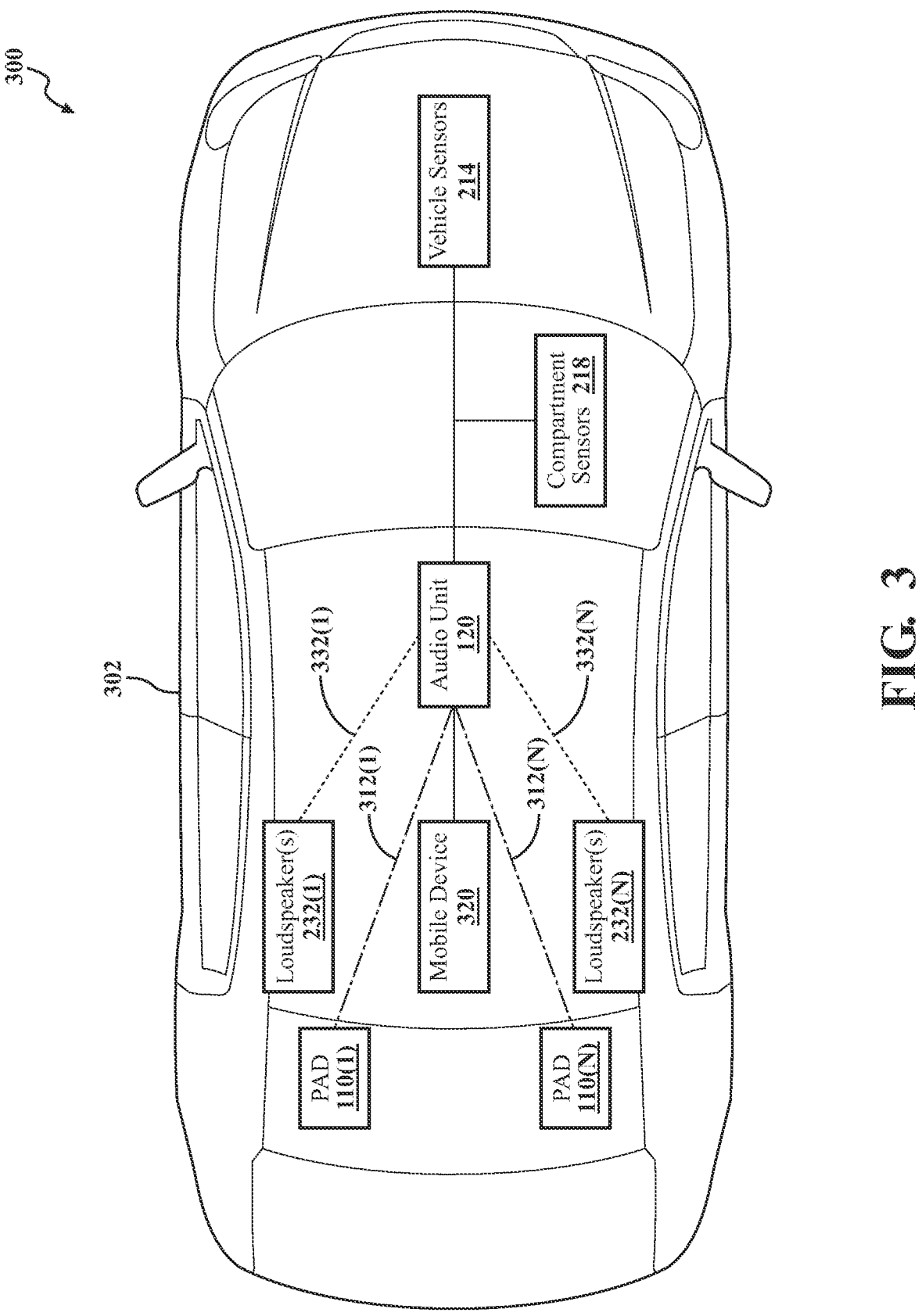
FIG. 3 is a block diagram of the example system in an example vehicle.

FIG. 3 is a block diagram of an example system 300 in a vehicle 302 that includes the audio unit 120 of FIG. 1, according to one or more embodiments. As shown, the system 300 includes, without limitation, a vehicle 302, a mobile device 320, personal audio devices 110, communications links 312 (wired and/or wireless), and audio links 332.

In operation, the mobile device 320 connects to the audio unit 120 to provide an audio signal. The audio unit 120 concurrently establishes streaming sessions with each of the personal audio devices 110(1), 110(2) and controls the loudspeakers 232(1), 232 respectively proximate to the position of the personal audio devices 110(1), 110(N) and provides the audio signal via the audio links 332. The audio unit 120 receives data from the vehicle sensors 214 and/or the compartment sensors 218 and generates mixed audio signals that incorporate information provided by the sensors 214, 218. The audio unit 120 transmits the audio signal and/or the mixed audio signal to the personal audio devices 110 via the communication links 312 and/or the loudspeakers 232 via the audio links 332.

In one or more embodiments, the personal audio device 110 uses a communications protocol, such as Bluetooth, to establish the communication link 312. In one or more embodiments, the audio unit 120 specifies the characteristics of the communications links 312 and/or the audio links 332 for the respective personal audio devices 110. For example, the audio unit 120 can mute the loudspeakers 232(1). In such instances, the audio unit 120 refrains from providing an audio signal to the loudspeakers 232(1). Alternatively, in some embodiments, the audio unit 120 can transmit inaudible audio signals (e.g., noise cancellation signals) for reproduction by the loudspeakers 232(1). In another example, the audio unit 120 can generate a set of component audio signals based on the audio signal and can separately transmit the component audio signals to the personal audio device 110(N) and loudspeakers 232(N), respectively. In such instances, the personal audio device 110(N) and loudspeakers 232(N) reproduce the respective component signals to collectively reproduce the audio signal provided by the audio source 104.

Figure 4:
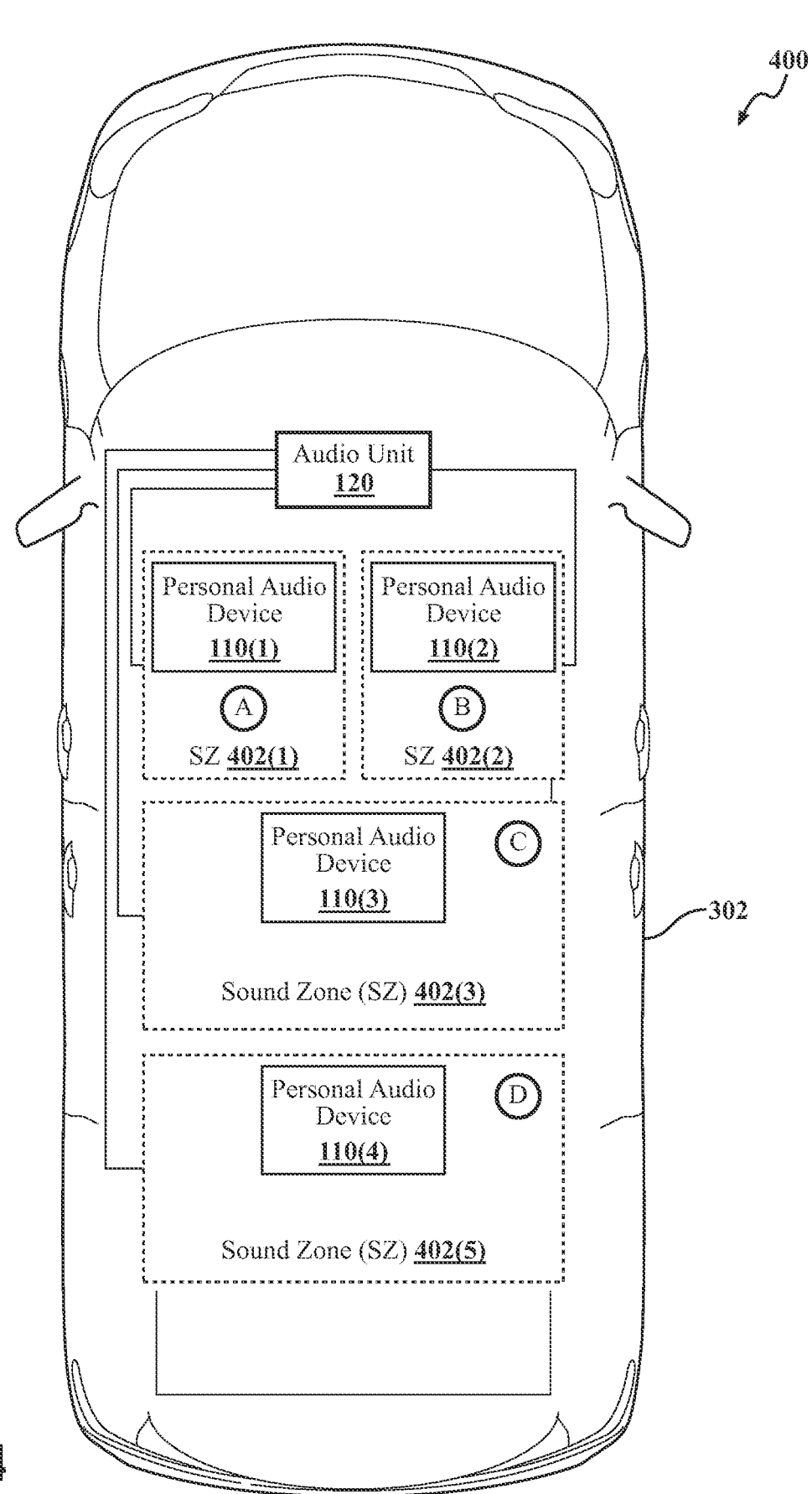
FIG. 4 is a block diagram of sound zones in an interior of the example vehicle.

FIG. 4 illustrates an interior 400 of the example vehicle 302 including the audio unit 120 of FIG. 1, according to one or more embodiments. As shown, the interior 400 includes, without limitation, personal audio devices 110 and sound zones 402 (e.g., 402(1), 402(2), etc.).

In one or more embodiments, the vehicle 302 includes various sets of loudspeakers 232 that generate a plurality of sound zones (e.g., 402(1), 402(2)) that are located at distinct positions within the vehicle 302 and provide personalized audio to an occupant. In some embodiments, the vehicle 302 includes multiple sets of loudspeakers 232 that generate sound zones 402(1)-402(6) in areas of the vehicle that correspond to individual seats or larger areas (e.g., the back row). In such instances, each sound zone 402 is located in an area proximate to a seat such that the ears of the occupant are within the sound zone 402 when seated at a specific position. For example, as shown, when an occupant sits in the front row passenger seat, the ears of the occupant are located within the sound zone 402(2).

In one or more embodiments, the one or more output devices 140 associated with the corresponding console and/ or other loudspeakers 232 positioned proximate to the seat generate the sound zone 402. In such instances, the audio unit 120 controls the loudspeakers 232 for a given sound zone 402 such that the personal audio device 110 operates in conjunction with, or in lieu of, the loudspeakers 232 in the sound zone 402. In such instances, the occupant of the sound zone hears the reproduced audio signal while other occupants hear little or none of the reproduced audio signal.

In one or more embodiments, the audio unit 120 determines the sound zone based on the position of each personal audio device 110. For example, the audio unit 120 determines that the personal audio device 110(4) is being worn by the occupant in the back row. In such instances, the audio unit 120 modifies the sound zone 402(5) to include the entire back row. The audio unit 120 then controls the set of loudspeakers 232 for the back row based on the configuration associated with the personal audio device 110(4) (e.g., selection of only subwoofers) and/or the preferences of the user (e.g., a stored user profile with a preference to mute all loudspeakers 232 in the sound zone 402(5)).

Figure 5:
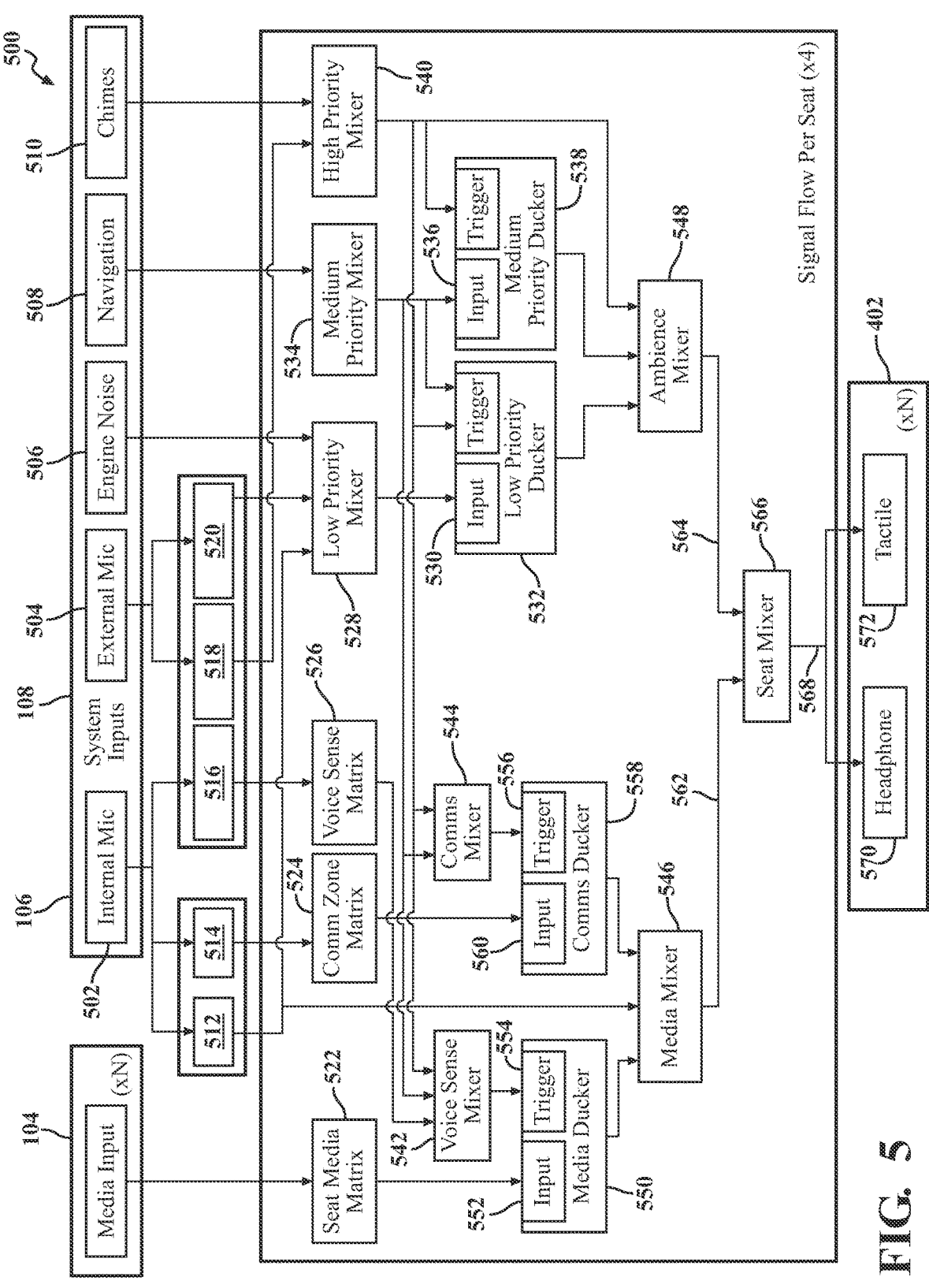
FIG. 5 is a block diagram that details a signal flow for each sound zone.
Figure 6:
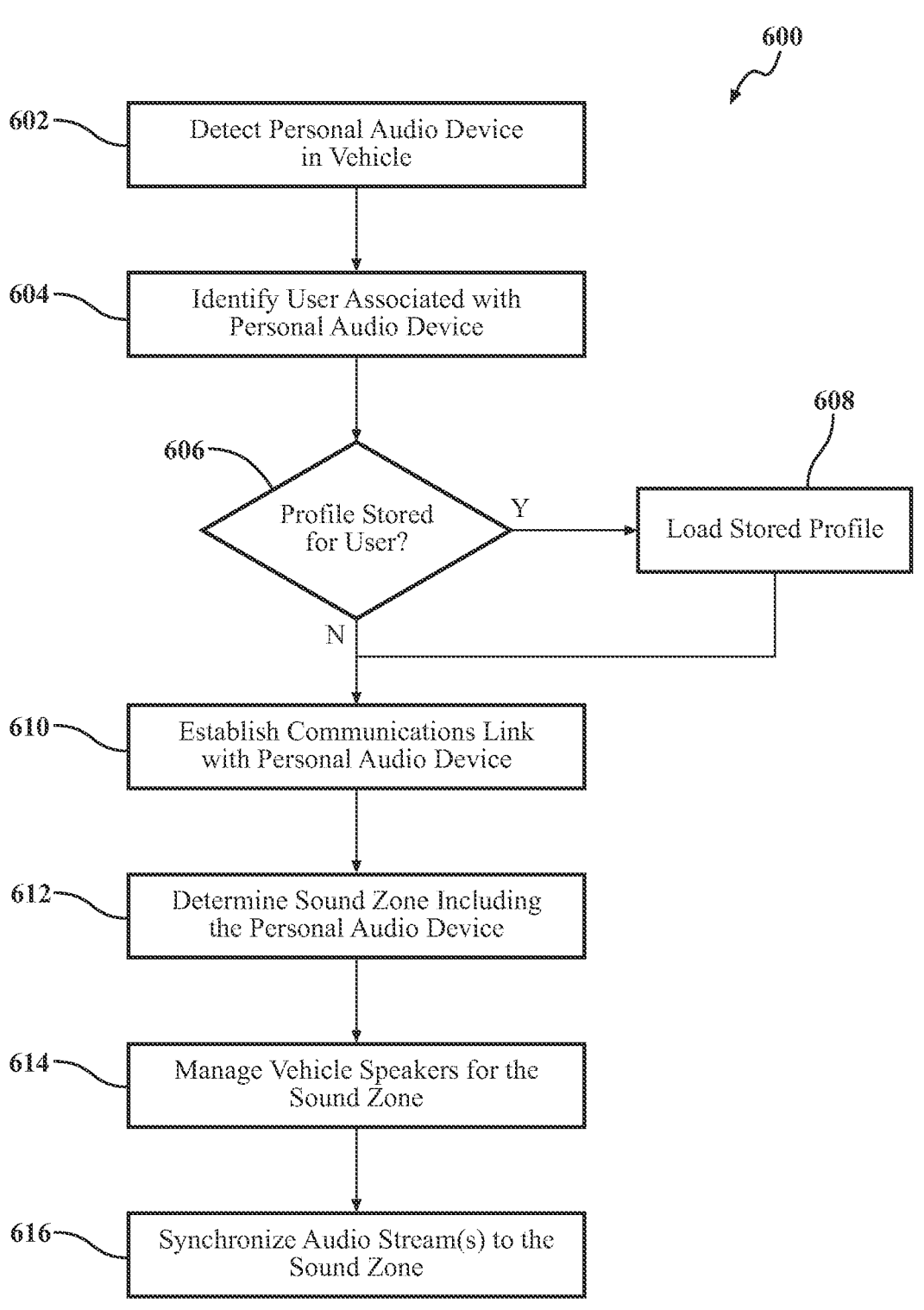
FIG. 6 is a flow diagram of method steps for synchronizing an audio stream between an audio unit and a personal audio device.

FIG. 5 is a block diagram that details a signal flow 500 for each sound zone 402, as processed by the computing device 102 to generate a mixed audio signal from one or more sources of incoming data, such as media inputs from personal audio devices (audio source(s) 104) and system inputs 106,108) for playback in each sound zone 402. The incoming data are processed and prioritized in a hierarchical manner, according to one or more embodiments to generate if, and how, they are to be played back at each personal sound zone 402(1)-402(N). The audio inputs may include, but are not limited to, media input(s) from audio sources 104(1)-104 (N) for each sound zone 402(1)-402(N), internal microphone(s) 502, external microphone(s) 504, engine noise 506, navigation prompts 508, and other vehicle chimes 510 (e.g., seat belt, door ajar, trunk open and the like). The occupant of each sound zone hears a reproduced audio signal for only their sound zone while they won't hear signals that have been reproduced for other occupants in other sound zones.

Internal microphones 502 are sensors within the vehicle cabin that detect sound, speech, and noise. Audio input signals from the internal microphone 502 sources may be preprocessed as needed. For example, the audio signal may undergo virtual venue processing 512 wherein algorithms are applied to tune the audio signal to recreate audio in a manner that transforms the vehicle cabin into a venue such as, for example, an auditorium or a stadium. As another example, audio input signals from the internal microphones 502 may be subjected to in-car communication (ICC) processing 514 which processes voice audio signals in a manner that ensures clear, two-way communication between occupants in the vehicle cabin. Signal processing may include, but is not limited to, automatically setting music volume or road noise in a manner that allows a conversation amongst passengers from front-to-back in different rows, etc. In yet another example, incoming data sourced from the internal microphone 502 may undergo processing 516 to reduce echo and background noise to remove unwanted cabin noise for occupants on a call or interacting with a voice assistant.

External microphones 504 are sensors on the exterior of the vehicle body that detect sound, speech, and noise outside of the vehicle that may need to be communicated to occupants inside the vehicle. Incoming data from the external microphone 504 sources may be processed 518 to include audio components that provide increased awareness of outside sounds to an occupant inside the vehicle. This feature enhances communication possibilities, for example, for the driver to have situational awareness of what is taking place outside of the vehicle. For example, the external microphone 504 provides audio components that may be mixed into a mixed audio signal that is transmitted to the driver to provide information about emergency vehicles, pedestrians, and cyclists outside of the vehicle. The external microphone 504 signal may also be subjected to processing 520 that reduces echo and background noise for occupants that may interact with pedestrians or cyclists outside of the vehicle.

Once the incoming data is processed as needed, the incoming data is managed for hierarchical prioritization according to one or more embodiments. Engine noise 506, navigation prompts 508, and vehicle system chimes 510 are other audio input signals that may be prioritized for playback depending on each personal zone and a user profile for an occupant in the personal zone. There are multiple levels of hierarchy, and each level of hierarchy involves a mixer block to blend that level into a composite signal. The composite signal is then presented, as a trigger input to a ducker block. The ducker block attenuates all of the lower priority audio signals to generate a network of simultaneous signals that are blended and mixed in a functional manner so that an occupant can take in the information in a way that they are able to understand it. Hierarchical prioritization is especially important for high priority signals like safety chimes and emergency alerts.

The example provided hereinafter, for simplicity purposes, the detailed description addresses signal flow for three levels of hierarchical priority. However, it should be noted that the inventive subject matter may be applied to more or fewer than three levels of hierarchical priority without departing from the scope of the present invention.

Further, the example provide hereinafter describes a number of matrices and mixers. It should be noted that the inventive subject matter may be applied to more or fewer than those described hereinafter, without departing from the scope of the inventive subject matter.

Incoming audio data is managed in matrices. At a first hierarchical level 500A, the incoming data is organized in matrix blocks from which it may be selected by a user or transmitted for further processing, for example in a mixer block or ducker block. Desired content may be selected from each matrix, for example, through volume adjustment, and/ or through personal profile settings. In the example shown in FIG. 5, the media inputs 104(1)-104 (N) are organized in a seat media matrix block 522 that includes all possible sources available for user selection. Each user selects their own source, and all users can share media. A communications zone matrix block 524 manages communications 514 between occupants in each personalized sound zone within the vehicle. A voice sense matrix block 526 manages signals related to occupants on a call or interacting with a voice assistant 520 within each personalized sound zone in the vehicle.

Incoming audio data is hierarchically prioritized into one or more priority levels. Each hierarchical priority level has a mixer block associated therewith to combine incoming data having the same hierarchical priority. For example, incoming data that is deemed to be high priority is assigned to a high priority mixer block 540. Incoming data that is deemed to be medium priority is assigned to a medium priority mixer block 534. Incoming data that is deemed to be low priority is assigned to a low priority mixer block 527. Incoming data that is considered high priority may include, but is not limited to, chimes 510 from various vehicle systems that alert the occupants to important, or critical, events related to the safety of occupants in the vehicle. Other incoming data that is considered high priority may relate to events such as, but not limited to, detection of an emergency vehicle 518. Incoming audio that is considered medium priority may include, but is not limited to, navigation prompts 508. An example of low priority audio data is engine noise 506, communications 520, via external mic 504 and incoming data processed at the virtual venue processing block 512.

The output of each mixer block 527, 534, 540 may trigger a corresponding ducker (to be described in detail later herein) to duck or attenuate lower priority incoming data below incoming audio data having a higher priority. The output of each mixer block 527, 534, 540 may also be an input to another mixer at a second hierarchical level 500B.

The low priority mixer block 528 mixes incoming audio data from audio sources that are considered low priority for playback at one or more personal sound zones. For example, the virtual venue 512 signal, the voice signal and/or noise signal processed 520 from the external microphone 504, and engine noise 506 may be considered low priority for playback in one or more personal sound zones. An output of the low priority mixer block 528 is an input 530 to a low priority ducker block 532.

The medium priority mixer block 534 mixes audio signals from audio sources that are considered medium priority for playback at one or more personal sound zones. For example, navigation prompts 508. An output of the medium priority mixer block 534 is an input 536 to a medium priority ducker block 538.

The high priority mixer block 540 mixes audio signals from audio sources that are considered high priority for playback at one or more personal sound zones. For example, audio signals from the external microphone 504 that detect an emergency vehicle 518 may be considered high priority, particularly for an occupant in the driver seat. Signals that may also be considered high priority are vehicle safety chimes 510 that may indicate lane departure warning, collision warning, a seat belt is unbuckled, a door is ajar, a trunk is ajar, a tire pressure is low, etc. An output of the high priority mixer block 540 is not ducked because it is important to always be played back at the appropriate personal sound zone. A signal output from the high priority mixer block 540 may serve as a trigger for the low priority ducker 532 and the medium priority ducker 538. Furthermore, the output from the high priority mixer block 540 may serve as an input to one or more mixer blocks to be described later herein.

A voice sense mixer block 542 mixes incoming data from each of the voice sense matrix block 526, the medium priority mixer block 534, and the high priority mixer block 540. An output from the voice sense mixer block 542 may serve as a trigger 554 for a media ducker block 550. The output from the seat media matrix 522 is an input 552 to the media ducker block 550. The trigger 554 from the voice sense mixer block 542 will cause the media ducker block 550 to duck or attenuate the input 552 from the seat media matrix so that the incoming data with higher priority takes precedence in a mixed signal that is ultimately presented to an occupant in a sound zone. For example, for driver's sound zone, the output of the high priority mixer 540 is more critical than the output of the medium priority mixer 534, which is more important to the driver than the output of the low priority mixer. Furthermore, an output from the voice sense matrix 526, for example incoming data from a phone call, may take precedence over entertainment media from the seat media matrix block 522. The media ducker block 550 is capable of mixing the incoming audio data appropriately to generate an input to a media mixer block 546.

A communications zone mixer block 544 also receives incoming data from the high and medium priority mixer blocks 534, 540. An output from the communications zone matrix block 524 is an input 560 to a communications ducker block 558. An output of the communications zone mixer block 544 is a trigger 556 to the communications ducker block 558. The trigger 556 causes the communications ducker block 558 to duck or attenuate the input 560 from the communications zone matrix block 524 so that signals having a higher priority are more prominently presented in the mixed audio signal that is being generated for any one of the sound zones 402. For example, the navigation prompt 534 will trigger the communications ducker block 556 to attenuate, or block, the input 560 from the communications zone matrix 524 so that the navigation prompt is more prominent in a signal being generated for presentation to the sound zone that is occupied by the occupant driving the vehicle.

A media mixer block 546 mixes signals from the media ducker block 550, the communications ducker block 558, and audio signal input from the signal processed by the virtual venue 512 algorithms. The composite signals from each of the media ducker block 550 and the communications ducker block 558 where they have been hierarchically prioritized and mixed with the signal processed by the virtual venue 512 to generate a composite signal that is input to the seat mixer block 546. A composite signal 562 generated by the media mixer block 546 is representative of media-related incoming data attenuated and ducked in a manner to be presented to the personal sound zones according to the hierarchical priority set and processed in the audio unit 120, any stored personal profile settings, and the personal audio device that is detected at the sound zone and linked to the audio unit along with communications-related incoming data attenuated and ducked in a manner to be presented to the personal sound zones 402 according to the hierarchical priority set and processed in the audio unit 120, any stored personal profile settings, and the personal audio device that is detected at the sound zone and linked to the audio unit.

An ambience mixer block 548 mixes signals from the low priority ducker block 532, the medium priority ducker block 538, and the high priority ducker block 540. A composite signal 564 generated by the ambience mixer block 548 is representative of signals external to the vehicle cabin such as, but not limited to, emergency vehicles 518, voice sensing from pedestrians or cyclists around the vehicle 520, engine noise 505. Additionally, or alternatively, the composite signal generated by the ambience mixer block 548 is representative of navigation prompts 508 and/or vehicle chimes 510 that may be related to safety, such as, but not limited to, lane departure warnings, collision warnings, seat belt chimes, door ajar chimes, and/or trunk ajar chimes, etc.

A seat mixer 566 receives the composite signals 562, 564 from the media mixer 546 and the ambience mixer 548 where they are mixed and managed according to the hierarchical priority which was generated as part of the signal flow, and the personal zone to which the signal is to be delivered. Because each personal zone has a personal audio device that is linked to and subscribed to audio sources, the composite signal generated at the seat mixer 566 includes signals that are relevant to a particular personal zone at the hierarchical priority which was assigned. For example, the driver subscribes to their own media content, which may include, but is not limited to, in-car communication content, navigation prompts, vehicle chimes, emergency vehicle detection, and selected in-vehicle infotainment media sources. In another example, an occupant in a personal zone in the rear of the vehicle may subscribe to only their own media content and in-vehicle communication content. In which case, the composite signal for an occupant driving the vehicle may be much more comprehensive than a composite signal for an occupant in a rear passenger seat sound zone.

The seat mixer 566 outputs a mixed audio signal 568 to each personal zone 402(1)-402 (N) accordingly. The output of the seat mixer may be presented audibly, for example through a headphone, or it may be presented as a tactile signal, for example, an actuator in a seat in the personal zone activated by the mixed audio signal. The mixed audio signal 568 is audible to an occupant of the corresponding sound zone through, for example, a headphone 570 worn by the occupant. Additionally, or alternatively, the mixed audio signal may include a tactile alert 572. The mixed audio signal 568 causes an actuator to deliver a physical sensation to the occupant, such as a vibration, a tap, or a click.

Figure 7:
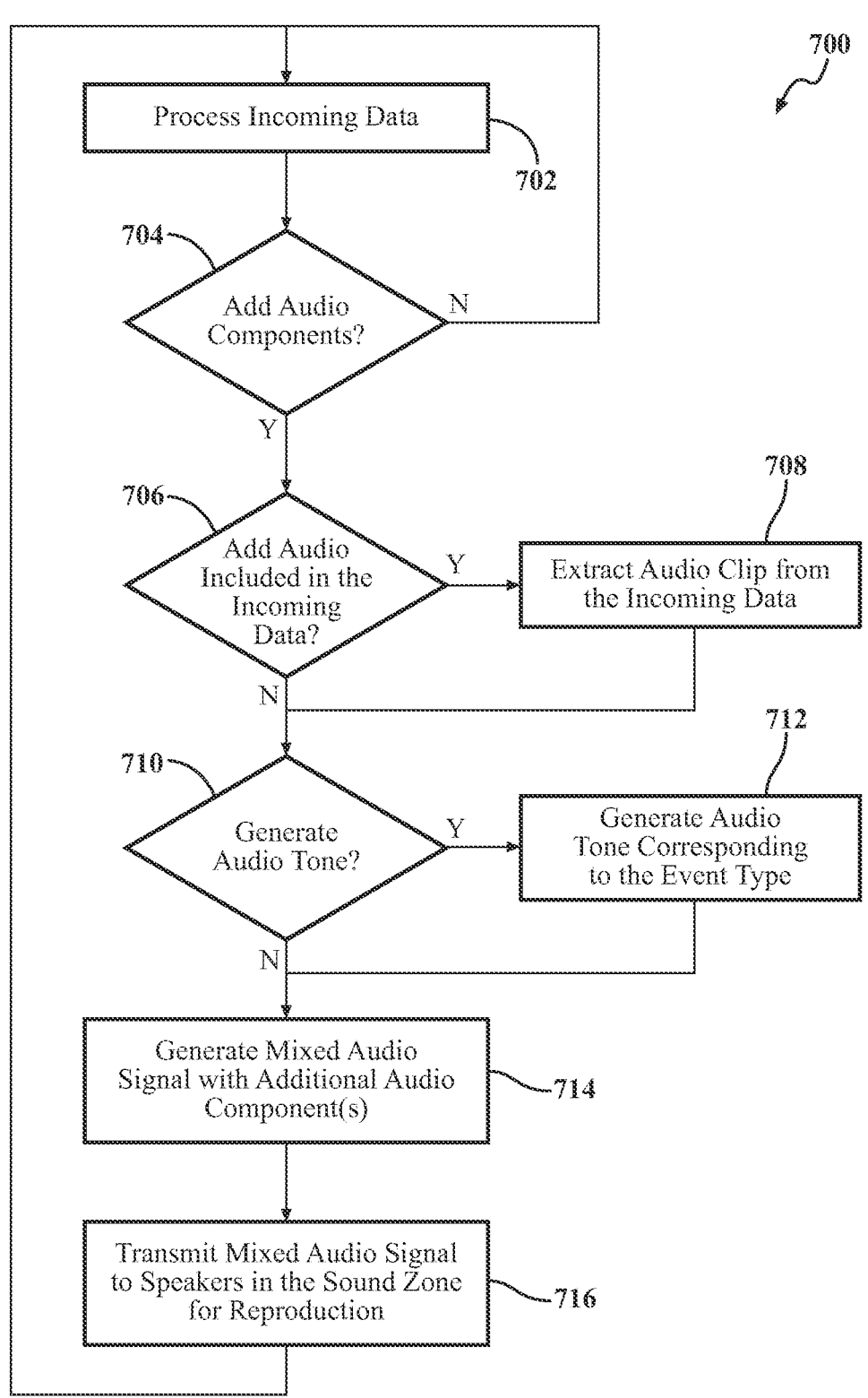
FIG. 7 is a flow diagram of method steps for generating a mixed audio signal based on data from a vehicle environment.

FIG. 7 is a flow diagram of method steps for generating a mixed audio signal, according to one or more embodiments. Although the method steps are described with respect to the systems of FIGS. 1-4, persons skilled in the art will understand that any system configured to perform the method steps, in any order, falls within the scope of the one or more embodiments. Various audio sources 104 provide media input to the computing device. System inputs 106, 108 may include audio signals from, but not limited to, internal microphone(s) 502, external microphone(s) 504, engine noise 506, navigation prompts 508, and other vehicle system chimes 508.

As shown, the method 600 begins at step 602, where the audio unit 120 detects a personal audio device 110 in a vehicle 302. In one or more embodiments, the audio unit 120 processes incoming data from one or more devices to detect that a given personal audio device 110(N) is at a position within the vehicle 302. In some embodiments, the input processing module 262 included in the audio unit 120 processes sensor data from the sensors 130 (e.g., compartment sensors 218) indicating the position of the personal audio device 110(N) within the vehicle 302. In some embodiments, the audio unit 120 receives messages directly from the personal audio device 110(N). In such instances, the synchronization module 266 of the audio unit 120 exchanges messages with the personal audio device 110(N) to determine the position of the personal audio device 110(N) within the vehicle 302.

At step 604, the audio unit 120 identifies a user associated with the personal audio device 110(N). In one or more embodiments, the audio unit 120 identifies a device identifier associated with the personal audio device 110(N). In such instances, the audio unit 120 scans the profiles 124 in the data store 122 to determine whether the personal audio device 110(N) is associated with a specific user and/or user profile. Alternatively, in some embodiments, the user provides an input via an input device (e.g., the mobile device 320, a vehicle console, etc.) to provide a check-in. In such instances, the audio unit 120 uses the information provided by the user during check-in to locate a profile 124 associated with the user.

At step 606, the audio unit 120 determines whether any profile 124 stored in the data store 122 is associated with the user. When the audio unit 120 identifies a profile 124 for the user, the audio unit 120 proceeds to step 608, where the audio unit 120 loads the profile 124 from the data store 122. Otherwise, when the audio unit 120 does not identify a profile 124 for the user and proceeds to step 610. In some embodiments, the audio unit 120 generates a profile for the user for use to stream to the personal audio device 110(N).

At step 610, the audio unit 120 establishes a communication link 312 with the personal audio device 110(N). In one or more embodiments, the audio unit 120 generates a direct connection with the personal audio device 110(N) by establishing a communication link 312(N) with the personal audio device 110(N). In one or more embodiments, the synchronization module 266 included in the audio unit 120 and the personal audio device 110(N) exchanges a set of messages to determine the characteristics of the communication link 312(N) (e.g., negotiating a capability set for the communication link 312(N), determining whether to establish a back channel, determining content protection, payload composition, etc.). Upon determining the characteristics, the audio unit 120 establishes the communications link 312(N) with the personal audio device 110(N).

At step 612, the audio unit 120 determines a sound zone that includes the personal audio device 110(N). In one or more embodiments, the input processing module 262 of the audio device processes a set of input data to determine the position of the personal audio device 110(N) and identify sound zone to provide personalized audio to the user positioned proximate to the personal audio device 110(N). In one or more embodiments, a subset of loudspeakers 232 within the vehicle may be associated with a predetermined sound zone (e.g., the sound zone 402(1)). In such instances, the audio unit 120 identifies the subset of loudspeakers 232 upon identifying the sound zone 402(1). Alternatively, the audio unit 120 uses a selection algorithm to identify a set of loudspeakers 232 in the vehicle 302 that are to provide sound to the sound zone 402(1).

At step 614, the audio unit 120 manages vehicle loudspeakers 232 for the sound zone 402. In one or more embodiments, the audio unit 120 manages the set of loudspeakers 232(N) that are associated with the sound zone 402(1) identified in step 612. In some embodiments, the audio unit 120 mutes the loudspeakers 232(N) for the sound zone 402(1) such that the personal audio device 110(N) reproduces the audio signal in lieu of the loudspeakers 232(N). Alternatively, the audio unit 120 can manage the loudspeakers 232(N) to reproduce the audio signal in conjunction with the personal audio device 110(N). In such instances, the audio unit 120 provides respectively portions to the personal audio device 110(N) and the loudspeakers 232(N) for reproduction within the sound zone 402(1).

At step 616, the audio unit 120 synchronizes the audio stream to the sound zone 402. In one or more embodiments, the synchronization module 266 of the audio unit 120 synchronizes the audio stream provided over the communication link 312(N) to the personal audio device 110(N) and/or audio links 332(N) to the loudspeakers 232(N) in the sound zone 402(1) to enable the devices to reproduce the audio signal. In one or more embodiments, the synchronization module 266 performs various techniques to reduce the latency between the audio source providing the audio signal and the personal audio device 110(N) reproducing the audio signal. For example, the audio unit 120 can dedicate a larger amount of processing resources to increase the throughput over the communications links 312(N), 332(N).

FIG. 7 illustrates a flow diagram of method steps for generating a mixed audio signal based on data from a vehicle environment, according to various embodiments. Although the method steps are described with respect to the systems of FIGS. 1-5, persons skilled in the art will understand that any system configured to perform the method steps, in any order, falls within the scope of the various embodiments.

As shown, the method 700 begins at step 702, where the audio unit processes incoming data. In various embodiments, the input processing module 262 of the audio unit 116 processes data from various devices (e.g., the sensors 130, the remote data sources 170, the entertainment subsystem 222, the network module 224, the navigation subsystem 226, etc.). The incoming data is associated with the environment, such as audio data from microphones recording the exterior environment of the vehicle, utterances from other occupants of the vehicle, events associated with the operation of the entertainment subsystem 222, the network module 224, the navigation subsystem 226, and so forth. In various embodiments, the input processing module 262 processes the incoming data while the output generation module 264 streams the audio signal to personal audio device 150 and the loudspeakers 232(N) for the sound zone 402(1). In such instances, the input processing module 262 can continually process the incoming data while the communication link 312(N) is established with the personal audio device 150(N).

At step 704, the audio unit 116 determines whether to add audio components to the audio signal based on the incoming data. In various embodiments, the input processing module 262 determines whether the incoming data indicates that an additional audio component is to be mixed with the audio signal. For example, the input processing module 262 receives a CAN message from a driver assistance system indicating an alert condition. In such instances, the input processing module 262 determines to provide additional audio components based on the alert condition. When the audio unit 116 determines to add audio components, the audio unit 116 proceeds to step 606; otherwise, the audio unit 116 determines to not to add audio components and returns to step 602 to further process incoming data.

At step 706, the audio unit 116 determines whether to add audio that is included in the incoming data. In various embodiments, the input processing module 262 determines to add audio content that is included in the incoming data. For example, the input processing module 262 responds to the CAN message from the driver assistance system by adding ambient sounds recorded by vehicle sensors 214 of the exterior environment. In another example, the input processing module 262 detects a conversation between two or more vehicle occupants that includes the user. In such instances, the input processing module 262 determines to include the utterances of the vehicle occupants that are recorded by an occupant-facing sensors 216 and/or a compartment microphone 218. When the audio unit 116 determines to add the audio content from the incoming data, the audio unit 116 proceeds to step 708. Otherwise, the audio unit 116 proceeds to step 710.

At step 708, the audio unit 116 extracts the audio clip from the incoming data. In various embodiments, the input processing module 262 identifies the audio clip for inclusion as the additional audio content. In such instances, the input processing module 262 extracts the audio clip from the set of incoming data. In some embodiments, the input processing module 262 further processes the audio clip. For example, when the audio clip is of ambient sounds of the environment, the input processing module 262 filters out portions of the ambient sound, such as by isolating specific sounds in the environment (e.g., emergency sirens, traffic notification sounds, etc.). In some embodiments, the input processing module 262 generates an audio loop from the audio clip such that a longer version of the audio clip is added to the audio signal.

At step 710, the audio unit 116 determines whether to generate an audio tone. In various embodiments, the input processing module 262 determines whether to generate an audio tone to mix with the audio signal. For example, the input processing module 262 can at step 604 detect an event that is associated with an audio tone (e.g., an alert condition, a navigation event, a notification provided by the entertainment subsystem 222, etc.). The audio tone can be generated in addition to audio content (e.g., an alert tone in addition to the ambient sound) or to indicate a non-audio event. When the audio unit 116 determines to generate the audio tone, the audio unit 116 proceeds to step 712; otherwise, the audio unit 116 determines not to add an audio tone and proceeds to step 714.

At step 712, the audio unit 116 generates the audio tone corresponding to the determined event type. In various embodiments, upon determining the type of event that is to be indicated with an audio tone, the audio unit 116 identifies an audio tone corresponding to the event type. In some embodiments, the data store 118 stores a set of tones that correspond to specific event types. For example, the data store 118 can store an air horn tone that is mapped to an alert event type, a bell alert that is mapped to an incoming call event type, a harp-string tone that is mapped to a navigation event type, and/or the like. In such instances, the output generation module 264 of the audio unit 116 generates the audio tone that is mapped to the determined event type.

At step 714, the audio unit 116 generates a mixed audio stream with the additional audio components. In various embodiments, the output generation module 264 of the audio unit 116 mixes the additional audio components (e.g., the audio clip and/or the audio tone) with the audio signal to generate a mixed audio signal. In various embodiments, the mixed audio signal includes an attenuated version of the audio signal provided by the audio source and the additional components. In this manner, the speakers in the sound zone 402 reproduce audio that provides contextual information about the vehicle environment during playback of the audio signal. In some embodiments, the audio unit 116 mixes the signal by substantially attenuating or muting specific ranges of the audio signal. In such instances, the additional audio components are more prominent in the mixed audio signal and are easier for the user to hear during playback.

At step 716, the audio unit 116 transmits the mixed audio signal to the sound zone for reproduction. In various embodiments, the output generation module 264 of the audio unit 116 transmits the mixed audio signal to the personal audio device 150(N) and the loudspeakers 232(N) in the sound zone 402(1) for reproduction. In some embodiments, the output generation module 264 generates separate component signals from the mixed audio signal. In such instances, the audio unit 116 transmits the respective component signals to the devices in the sound zone 402(1) to reproduce a component of the mixed audio signal. Upon transmitting the mixed audio signal for reproduction, the audio unit 116 returns to step 602 to process other incoming data.

Figure 8:
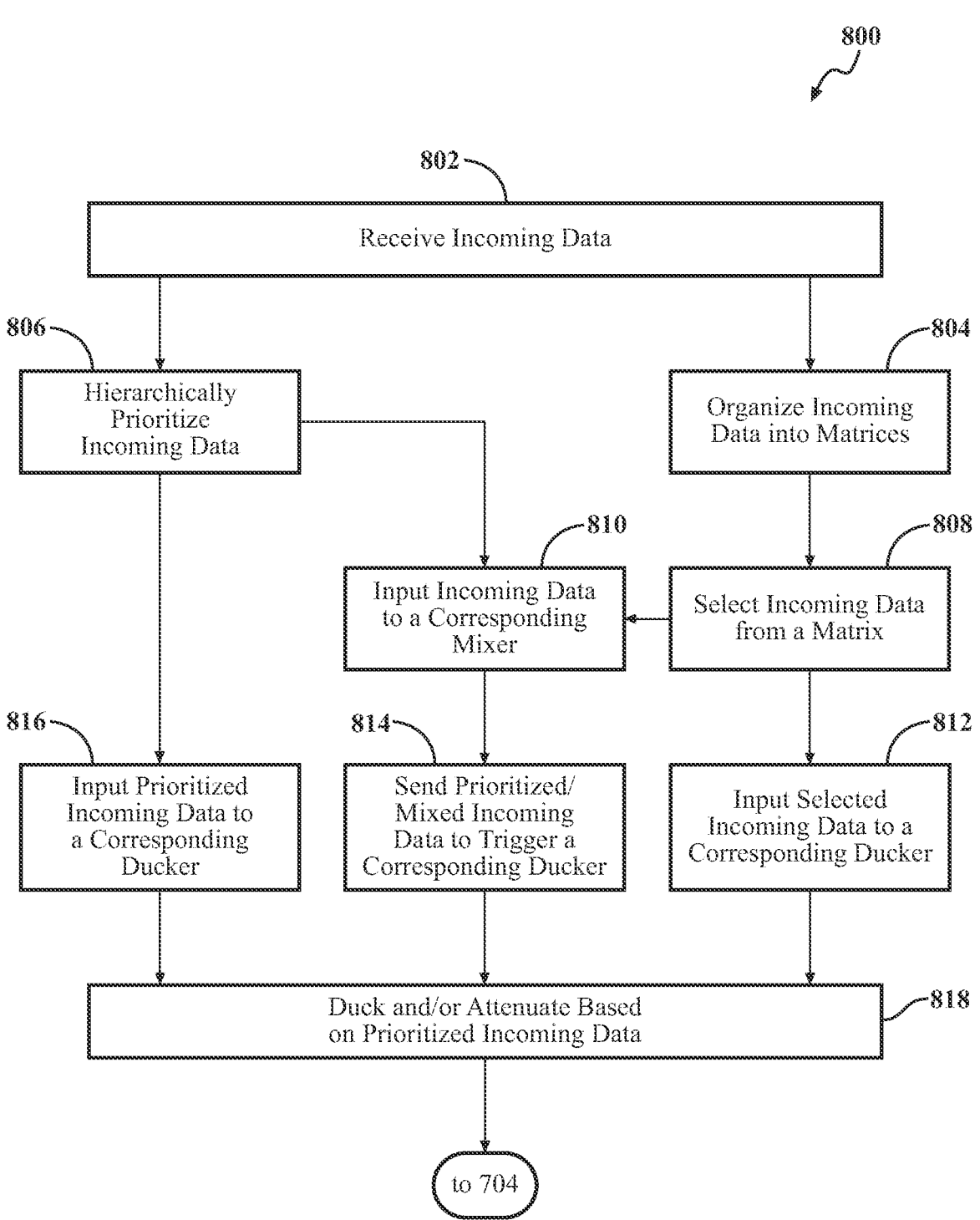
FIG. 8 is a flow diagram of method steps for processing incoming audio data according to hierarchical prioritization.

FIG. 8 illustrates a flow diagram of a method 800 for hierarchically prioritizing incoming data to be processed by the audio unit as described at step 702 in FIG. 7.

As shown, the method 800 begins at step 802, where the audio unit 120 receives incoming data. In one or more embodiments, the input processing module 262 of the audio unit 120 receives data from various devices (e.g., the audio sources 104, the sensors 106, the I/O devices 108, remote data sources 114, personal audio devices 110, the entertainment subsystem 222, the network module 224, and the navigation subsystem 226, etc.). In one or more embodiments, the input processing module 262 continually processes the incoming data while the communication link 312(N) is established with the personal audio device 110(N).

At step 804, the audio unit 120 organizes the incoming data into one or matrices within which incoming data is collected and organized. In the example described herein, the one or more matrices that receive incoming data may be, but are not limited to, the seat media matrix block522, the communications zone matrix block 524, and the voice sense matrix block 526. For example, incoming data from the audio sources 104(a)-104(n) is organized in the seat media matrix block 522. In another example, audio data from the in-car communications system 514 is organized in the communications zone matrix block 524.

At step 806, the audio unit also prioritizes the incoming data into a plurality of hierarchical levels, for example, high, medium, and low priority. The incoming data is prioritized by assigning incoming audio data as audio components that may be added to the mixed audio signal 568 by way of one of the low priority mixer block 528, the medium priority mixer block 534 and the high priority mixer block 540. For example, the input processing module 262 receives incoming data in the form of an alert that an emergency vehicle has been detected. Emergency vehicle detection incoming data 518 is assigned to the high priority mixer block 540. In another example, the input processing module receives incoming data in the form of a navigation prompt from the navigation subsystem 508. Navigation prompt is audio that may be added to incoming data and is assigned to the medium priority mixer block 534.

At step 808, incoming data is selected from one or more of the matrices. The selected data is intended to be played back at the personal audio device associated with a particular sound zone.

At step 810, the audio input unit 120 directs the incoming data prioritized from the high priority mixer block 540, the medium priority mixer block 534 and the low priority mixer block 528 as inputs to be mixed signals with signals from a corresponding matrix blocks 522, 524, 526 that have been organized. For example, voice sense incoming data from the voice sense matrix block 526 is mixed at the voice sense mixer with medium and/or high priority mixed signals from the medium priority mixer block 534 and the high priority mixer block 540 according to its hierarchical prioritization completed at the first hierarchical level. For example, voice data from the voice sense matrix block 526 will be mixed with incoming audio from the medium priority mixer block 534 and incoming audio from the low, medium, and high priority mixer blocks 528, 534, 540. Incoming data from the high priority mixer block 540 will be prioritized over the incoming audio from the medium priority mixer block 534, while incoming data from the medium priority mixer block 534 will be prioritized over the incoming audio from the voice sense matrix block 526.

At step 812, the audio input unit 120 directs the incoming data selected from the matrices as an input to a corresponding ducker block. For example, the incoming data from the seat media matrix block 522 is media related and therefore, it is an input to the media ducker block 546. The incoming data from the communications zone matrix block 524 is communications related and therefore, it is an input to the communications ducker block 556.

At step 814, the audio unit 120 directs the prioritized and mixed incoming data from the mixers to the corresponding duckers as a trigger. For example, the incoming data mixed at the voice sense mixer block 542 triggers the media ducker block 550. Voice sensed incoming data takes priority over media incoming data, so media incoming data is deferred to the voice signals when the incoming data is to be combined and added to the mixed audio signal. In another example, the incoming data output from the communications mixer block 544 is a trigger for the communications ducker block 558. The incoming data from the medium priority mixer block 534 and the high priority mixer block 540 are triggers for the low priority ducker block 530. And the incoming data from the high priority mixer block 540 is a trigger for the medium priority ducker block 538.

At step 816, the audio unit 120 directs the prioritized and mixed incoming data from the mixers to the corresponding duckers as an input. The incoming data from the low priority mixer block 528 is an input to the low priority ducker block 532, and the incoming data from the medium priority mixer block 534 is an input to the medium priority ducker block 538.

In practice, the prioritized and mixed incoming data from the high and medium priority mixers take precedence over incoming data related to communications. For example, incoming data related to an emergency vehicle being detected or a navigation prompt will take precedence over incoming data related to in-vehicle communications between occupants or between an occupant and a virtual assistant.

At step 818 the prioritized and mixed signals are ducked and attenuated as triggered according to the hierarchical prioritization. At this point, the ducked, attenuated, and mixed incoming data is processed, as indicated at step 702 in FIG. 7 to generate the mixed audio signal.

The audio unit of the inventive subject matter hierarchically prioritizes audio signals provided to one or more personal audio devices and the position of the personal audio device within the vehicle. The audio unit detects a given a given personal audio device and the position of the personal audio device within the vehicle. The audio unit loads a stored profile for the personal audio device and/or the user associated with the personal audio device. The audio unit establishes a communications link with the personal audio device to provide an audio stream for playback by the personal audio device. In various embodiments, the audio unit determines an audio zone for the personal audio device based on the position of the personal audio device within the vehicle and manages one or more speakers in the sound zone, such as by muting the speakers, or by providing portions of the audio stream to the speakers for reproduction of the audio stream in conjunction with the personal audio device.

Upon streaming an audio signal to the personal audio device, the audio unit processes incoming data received from one or more vehicle components, such as audio data, sensor data, and/or other types of data. The audio unit processes the data to determine whether to add audio portions to the audio stream. When the audio unit hierarchically prioritizes and determines if and when audio portions should be added, the audio unit extracts an audio clip from the incoming data or adds an audio tone notification. The audio unit mixes the additional audio portion with the audio stream to generate a mixed audio stream for transmission to the personal audio device and speakers in the sound zone.

At least one technological advantage of the integrated in-vehicle personal audio system relative to the prior art is that, with the disclosed techniques, the integrated in-vehicle personal audio system provides high-fidelity audio reproductions of audio signals from within a vehicle while providing contextual information about a driving environment to occupants of the vehicle in a manner that presents them all simultaneously allowing critical safety alerts to be presented in parallel with less critical alerts and indicators in a manner that properly ducks, or attenuates, the less critical alerts to the alerts that are considered to be more critical. Further, by incorporating compatible personal audio components to generate a personalized sound zone for a given occupant, the integrated in-vehicle personal audio system provides a less-complex, more cost-efficient solution to provide high-fidelity audio to individuals than conventional in-vehicle audio systems. These technical advantages provide one or more technological advancements over prior art approaches.

Any and all combinations of any of the claim elements recited in any of the claims and/or any elements described in this application, in any fashion, fall within the contemplated scope of the present invention and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method comprising:

detecting, by an audio unit in a vehicle, one or more personal audio devices within the vehicle;

establishing a link with at least a first personal audio device of the one or more personal audio devices;

receiving incoming data, the incoming data being from sources inside and outside of the vehicle;

organizing incoming data from audio sources and vehicle system inputs into one or more matrices to define organized incoming data;

hierarchically prioritizing the incoming data into one or more of a first priority mixer, a second priority mixer and a third priority mixer to define prioritized incoming data, wherein the step comprises:

assigning a first hierarchical priority level to incoming data from a plurality of sources and system inputs;

mixing incoming data from the plurality of sources and system inputs according to the assigned priority;

assigning a second hierarchical priority level to incoming data and to the mixed incoming data hierarchically prioritized at the first hierarchical priority level, the second hierarchical priority level takes precedence to the first hierarchical level and is mixed with the incoming data from the plurality of sources and system inputs, wherein the incoming data at the first hierarchical level is ducked or attenuated below the incoming data prioritized at the second hierarchical level; and assigning a third hierarchical priority level to incoming data and to the mixed incoming data hierarchically prioritized at the second hierarchical priority level, the incoming data at the third hierarchical priority level takes precedence to the incoming data at the second hierarchical level, wherein the incoming data at the second hierarchical level is ducked or attenuated below the incoming data at the third hierarchical level;

mixing the organized incoming data with the prioritized incoming data according to the assigned priority to generate a mixed audio signal;

and transmitting the mixed audio signal over the link for playback by the first personal audio device.

2. The method as claimed in claim 1, wherein the step of organizing incoming data from audio sources and vehicle system into one or more matrices further comprises organizing incoming data from sources inside the vehicle into a seat media matrix, a communications zone matrix, and a voice sense matrix.

3. The method as claimed in claim 1, wherein the step of mixing the organized incoming data with the prioritized incoming data further comprises mixing in a voice sense mixer and a communications mixer.

4. The method as claimed in claim 1, wherein the step of generating a mixed audio signal further comprises a media mixer to mix signals from sources inside the vehicle and an ambience mixer to mix signals from sources outside the vehicle.

5. The method as claimed in claim 1, wherein the step of transmitting the mixed audio signal further comprises the mixed audio signal stimulating at least one of an audio playback device or a tactile actuator.

6. A system comprising:

an audio unit in a vehicle having a processor and a memory for storing an audio management application, the audio unit detects one or more personal audio devices within the vehicle;

a link between the audio unit and at least a first personal audio device of the one or more personal audio devices;

incoming data being received at the audio unit;

the processor is coupled to the memory to execute the audio management application by performing the steps of:

organizing incoming data into one or more matrices to define organized incoming data;

hierarchically prioritizing the incoming data into one or more of a first priority mixer, a second priority mixer and a third priority mixer to define prioritized incoming data, the prioritized incoming data comprises:

a first hierarchical priority level to incoming data from a plurality of sources and system inputs;

a second hierarchical priority level to incoming data and to the mixed incoming data hierarchically prioritized at the first hierarchical priority level, the second hierarchical priority level takes precedence to the first hierarchical level and is mixed with the incoming data from the plurality of sources and system inputs, wherein the incoming data at the first hierarchical level is ducked or attenuated below the incoming data prioritized at the second hierarchical level; and a third hierarchical priority level to incoming data and to the mixed incoming data hierarchically prioritized at the second hierarchical priority level, the incoming data at the third hierarchical priority level takes precedence to the incoming data at the second hierarchical level, wherein the incoming data at the second hierarchical level is ducked or attenuated below the incoming data at the third hierarchical level:

the audio management application mixing the organized incoming data with the prioritized incoming data to generate a mixed audio signal;

and the mixed audio signal is played back by the first personal audio device.

7. The system as claimed in claim 6, wherein the one or more matrices further comprises a seat media matrix, a communications zone matrix, and a voice sense matrix.

8. The system as claimed in claim 6, further comprising a voice sense mixer and a communications mixer for mixing the organized incoming data with the prioritized incoming data.

9. The system as claimed in claim 6, further comprising a media mixer to mix signals from sources inside the vehicle and an ambience mixer to mix signals from sources outside the vehicle.

10. The system as claimed in claim 9, further comprising a seat mixer to mix signals from the media mixer and the ambience mixer based on an assigned priority level.

11. The system as claimed in claim 6, further comprising at least one of an audio playback device or a tactile actuator that is activated by the mixed audio signal being played back by the first personal audio device.

12. One or more non-transitory computer-readable media storing instructions that, when executed by one or more processors, cause the one or more processors to comprise the steps of:

detecting, by an audio unit of a vehicle, one or more personal audio devices within the vehicle;

establishing a link with at least one of the one or more personal audio devices;

receiving incoming data from sources inside and outside of the vehicle;

assigning a first hierarchical priority level to incoming data from a plurality of sources and system inputs:

assigning a second hierarchical priority level to incoming data and to the mixed incoming data hierarchically prioritized at the first hierarchical priority level, the second hierarchical priority level takes precedence to the first hierarchical level and is mixed with the incoming data from the plurality of sources and system inputs, wherein the incoming data at the first hierarchical level is ducked or attenuated below the incoming data prioritized at the second hierarchical level; and assigning a third hierarchical priority level to incoming data and to the mixed incoming data hierarchically prioritized at the second hierarchical priority level, the incoming data at the third hierarchical priority level takes precedence to the incoming data at the second hierarchical level, wherein the incoming data at the second hierarchical level is ducked or attenuated below the incoming data at the third hierarchical level;

generating a mixed audio signal that combines the incoming data from the plurality of sources and system inputs according to the assigned priority; and transmitting the mixed audio signal over the link for playback by the one or more personal audio devices.

13. The one or more non-transitory computer-readable media of claim 12, wherein the step of transmitting the mixed audio signal over the link for playback by the one or more personal audio devices further comprises the mixed audio signal stimulating at least one of an audio playback device or a tactile actuator.

\* \* \* \* \*